United States Patent Office 3,292,996
Patented Dec. 20, 1966

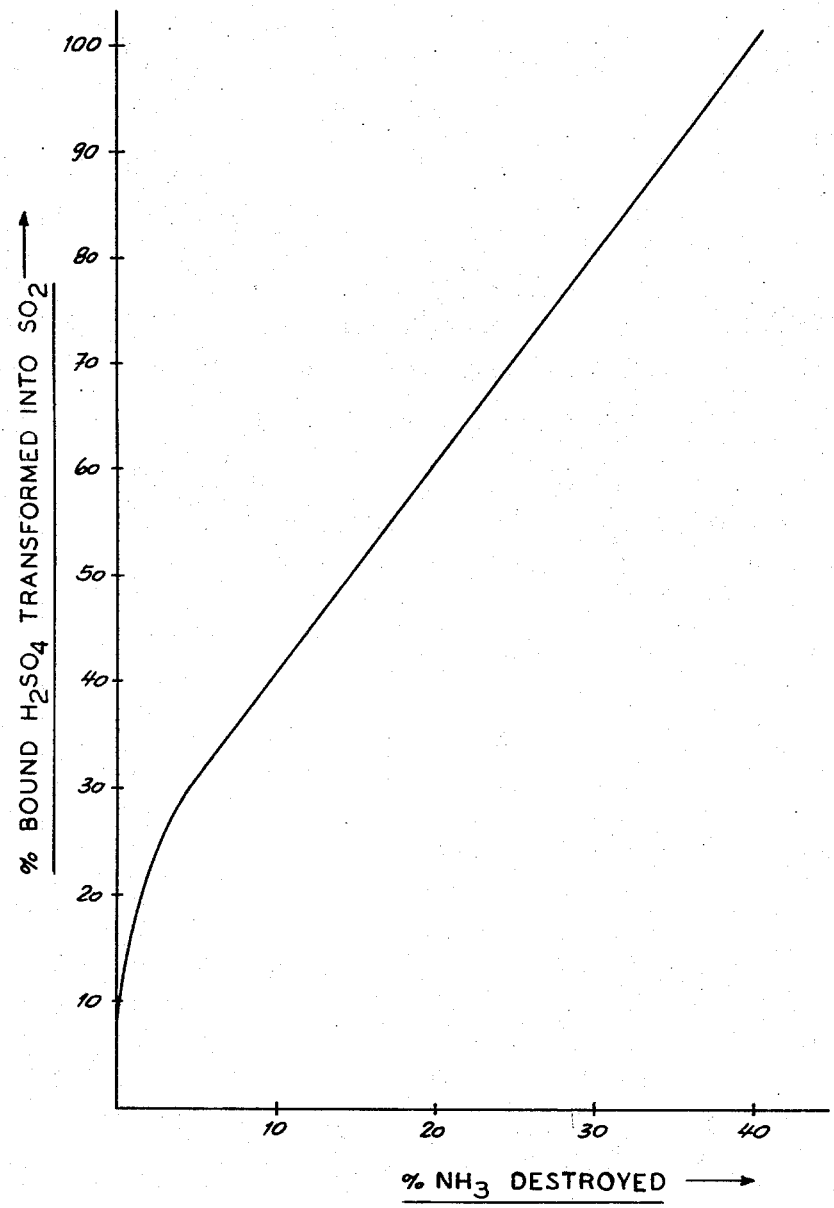

3,292,996
METHOD OF RECOVERY OF SULFUR OXIDES AND AMMONIA
Herbert Furkert, Junkersdorf, near Cologne, and Hans Mühlenbein, Cologne-Lindenthal, Germany, assignors to Chemiebau Dr. A. Zieren G.m.b.H., Cologne-Braunsfeld, Germany, a corporation of Germany
Filed Oct. 27, 1964, Ser. No. 406,764
Claims priority, application Germany, Oct. 31, 1963,
C 31,287
7 Claims. (Cl. 23—178)

The present invention relates to a method of recovery of sulfur oxides and ammonia, in general, and in particular to such method for separate recovery of sulfur oxides and ammonia from ammonium hydrogen sulfate or sulfuric acid solutions of ammonium sulfate, such as those often obtained in large quanties in the chemical industry.

In particular, waste liquors should be mentioned here, which result from the manufacture of acrylic compounds and of methycrylic compounds and their esters, respectively.

These solutions contain in addition to ammonium hydrogen sulfate, 10–15% free sulfuric acid, 0–20% organic material and water. Futhermore, it is of advantage in some cases, to work waste sulfuric acids, for instance, those which are derived from the petroleum industry, to recover the ammonia salts. Due to the abundance of ammonium sulfate, its recovery from these solutions does not pay, where this can be accomplished only with great effort. In these cases, decomposition of the ammonium sulfate into sulfur oxides, and $NH_3$ is advisable. Several methods have been described for this purpose.

In accordance with A. M. Schtschuharew (C 36 II 667), ammonium sulfate is heated with $Fe_2O_3$, to release first $NH_3$, and then by ignition $SO_3$. I. W. Delepaine (Chem. Engng. Progr. 51, 499–503 (1955) uses zinc oxide instead of $Fe_2O_3$. It has been proposed to heat ammonium sulfate together with sodium sulfate, whereby $NH_3$ escapes with the formation of sodium hydrogen sulfate. The sodium hydrogen sulfate then gives off $SO_3$ at a higher temperature. These methods described herein have, however, the drawback, that the excess of sulfuric acid must first be combined, whereby the turnover of the raw material becomes very large under these circumstances.

It has been observed that, in the presence of carbon or reducing carbon compounds, large quantities of $SO_2$ are formed from the sulfates at temperatures above 350° C., and ammonia is expelled. Simultaneously, a part of the ammonia is destroyed. The same phenomenon can be observed with the methacrylic ester waste liquors, if the latter are heated to about 400° C.–450° C. until the organically combined carbon is completely reacted, or by feeding evaporated liquors over carbon or coke of 300° C. to 450° C. With complete reduction of the sulfate sulfur to $SO_2$, ammonia losses up to 40% are observed.

It is, therefore, one object of the present invention to provide a more advantageous method for the recovery of sulfur oxides, wherein the excess of sulfuric acid is removed by reducing the same to $SO_2$ prior to the addition of auxiliary chemicals. It has been further found that one can operate with only nominal $NH_3$ losses, if this reduction procedure is terminated.

With this and other objects in view, which will become apparent from the following detailed description, the present invention will be clearly understood in connection with the accompanying drawing, in which the figure discloses a diagram indicating the $NH_3$ losses in relation to the percentage of combined $H_2SO_4$ converted into $SO_2$.

Referring now to the drawing, the diagram indicates that the loss of $NH_3$ is still below 5%, if in addition to the total free sulfuric acid 30% of the sulfuric acid combined with $NH_3$ in a methacrylic acid methyl ester waste liquor, are reduced to $SO_2$. If, for instance, the reduction of the free acid is continued until 42% of the combined acid is reduced, the $NH_3$ loss increases to 10%.

One will attempt, however, to reduce as much as possible of the combined acid, limited by the consideration of the $NH_3$ losses, in order to favor the further working to recover $NH_3$ for which a content of sulfuric acid in excess of the content of ammonium sulfate constitutes only an unnecessary ballast. In order to obtain the optimum $SO_2$ and $NH_3$ figures, a process is applied in accordance with the present invention, in which the liquors are completely evaporated and then fed through a tube which is heated to about 250° C. to 500° C., preferably 430° C., after adjusting the ratio of reducing substance to the total sulfuric acid such, that the ammonia losses remain as low as possible. This adjustment can take place in a material having a low reducing agent content, by adding such an agent for instance, $H_2$, $H_2S$, carbon, sulfite liquor, CO or hydrocarbons, or in case of a material having an excess of reducing agent, the latter is compensated for by addition of sulfuric acid (waste acid) or, if possible organic substance is removed from the liquors. In the case of methacryl ester waste liquors boiling off the volatile substances suffices.

In case of a C surplus, it is also possible, to permit reaction only to the desired part by timely limiting the heating of the liquor to 250° C.–490° C., and to separate the C surplus, for instance, after dissolution of the melt in water, and again evaporating the resultant solution.

By means of the described operational methods a mixture of ammonium sulfate and ammonium hydrogen sulfate is obtained, which is free of carbon or other reducing organic substances. This mixture can be worked up in accordance with the known methods for the recovery of $NH_3$.

*Example 1*

A sample of a methacrylic acid methyl ester waste liquor has been heated to 170° C., whereby 23.5% of the weight has been lost. One part of the residue has been evaporated in a water vapor $N_2$ atmosphere at 430° C. and upon passing through a quartz tube, filled with stone wool and heated to 430° C., $SO_2$ and a white substance, free from carbon, are obtained, which substance comprised 52.3 g. $NH_4HSO_4$ and 17.5 g. $(NH_4)_2SO_4$. Starting from a quantity of 120 ml. of waste liquor with 12.5 g. $NH_3$, the salt mixture contained 98% of the charged ammonia.

The obtained product has been treated with 107.5 g. of potassium sulfate and heated to 400° C. by passing superheated steam for 1 hour. Practically the total $NH_3$ could be driven out. 35 mg. remained in the melt.

*Example 2*

75 ml. of a methacrylic acid methyl ester waste liquor, which contained 7.8 g. $NH_3$, 21.2 g. free sulfuric acid, 46.3 g. combined sulfuric acid, 16 g. organic substances and water, was dropped into a quartz alembic of a volume of 500 ml. at 350° C. bath temperature for a period of 55 minutes. At this temperature water some volatile organic substance evaporated and $SO_2$ escaped. It had been kept quiescent for 5 minutes at 350° C. The organic substance had partly decomposed by carbon formation. After cooling the alembic content was dissolved in water and the remaining carbon was filtered off. The filtrate contained 7.8 g. $NH_3=100\%$. The $SO_2$ formed in the alembic has been analytically determined and corresponded to 24.3 g. sulfuric acid.

Example 3

75 ml. of the same methacrylic ester waste liquor, as in Example 2, were completely evaporated for 38 minutes at about 400° C. and fed through a quartz tube filled with stone wool and heated to 360° C. Here, the carbon formed was temporarily entrained by the vapor, and the evaporated organic substance had an opportunity to convert completely. The optimum ratio of the substances used for the reduction to the total sulfuric acid was surpassed thereby and therefore only 6.9 g. $NH_3$=88.4% from 7.8 g. $NH_3$ contained in the starting material was recovered. The $SO_2$ formed, corresponded to 41.1 g. sulfuric acid.

While we have disclosed several embodiments of the present invention, it is to be understood that these embodiments are given by example only and not in a limiting sense, the scope of the present invention being determined by the objects and the claims.

We claim:

1. A method of recovering sulfur dioxide and ammonia from source material selected from the group consisting of ammonium salts of sulfuric acid, solutions of ammonium salts of sulfuric acid in water, and solutions of ammonium salts of sulfuric acid in water containing excess sulfuric acid, comprising heating said source material in the presence of a reducing agent selected from the group consisting of hydrogen, hydrogen sulfide, carbon, sulfite liquor, carbon monoxide and organic reducing agents, at a temperature of between 250° C. and 500° C., to convert any free sulfuric acid in said source material and also a portion of the sulfuric acid combined in the form of said ammonium salt of sulfuric acid, into sulfur dioxide, whereby the remaining sulfur and ammonium salt materials are in the form of a mixture of ammonium sulfate and ammonium bisulfate, and recovering ammonia from said mixture.

2. The method, as set forth in claim 1, wherein not more than 40% of the sulfuric acid combined in the form of said ammonium salts of sulfuric acid, is reduced to sulfur dioxide.

3. The method as set forth in claim 1, wherein about 30% of the sulfuric acid combined in the form of said ammonium salts of sulfuric acid, is reduced to sulfur dioxide.

4. The method, as set forth in claim 1, wherein when said source material contains said reducing agent in excess of the amount required to reduce the desired amount of sulfuric acid, said excess of reducing agent is removed.

5. The method, as set forth in claim 1, wherein when said source material contains an amount of said reducing agent in excess of that required to reduce said sulfuric acid in the desired amount, additional sulfuric acid is added.

6. The method, as set forth in claim 4, wherein said excess of reducing agent is removed by heating said source material to volatilize the excess which is present.

7. The method, as set forth in claim 1, wherein said source material is evaporated and the reduction is carried out in the vapor phase.

References Cited by the Examiner

UNITED STATES PATENTS

| | | | |
|---|---|---|---|
| 2,926,070 | 2/1960 | Milliken | 23—167 |
| 2,927,001 | 3/1960 | McCullough | 23—193 |

MILTON WEISSMAN, *Primary Examiner.*

OSCAR R. VERTIZ, A. J. GREIF, *Assistant Examiners.*